(12) United States Patent
Saji et al.

(10) Patent No.: US 6,345,027 B1
(45) Date of Patent: Feb. 5, 2002

(54) DISK DRIVING APPARATUS

(75) Inventors: Yoshito Saji, Nishinomiya; Benichi Miyazaki, Osakasayama; Tadashi Maeoka, Hirakata; Masayuki Shinoda, Nara, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,189

(22) Filed: Oct. 22, 1997

(30) Foreign Application Priority Data

Oct. 22, 1996  (JP) ............................................. 8-279161

(51) Int. Cl.⁷ ............................................. G11B 33/02
(52) U.S. Cl. ..................................................... 369/77.1
(58) Field of Search ................................ 369/75.1, 75.2, 369/77.1, 77.2, 37

(56) References Cited

FOREIGN PATENT DOCUMENTS

JP         5-182335       7/1993       ................... 369/37

*Primary Examiner*—Brian E. Miller
*Assistant Examiner*—Tod Kupstas

(74) *Attorney, Agent, or Firm*—Ratner & Prestia

(57) ABSTRACT

A disk driving apparatus includes: a head base unit which supports a head for recording data into and reproducing data from a storage medium, the head base unit being able to travel between a first position where the head is close to the storage medium for recording data thereto and reproducing data therefrom and a second position where the head is apart from the storage medium; a tray provided with a tray rack extending in a predetermined direction, the tray being slidable along the tray rack between a third position at which the head performs recording and reproduction on the storage medium and a fourth position at which an operator can place the storage medium; a driving power source; a tray gear which is driven by the driving power source; a rotation body gear which is driven by the driving power source; a partial gear which partially engages with the rotation body gear at a predetermined angle; and a rotation body which, in accordance with the rotation of the partial gear, reciprocally rotates so that the head base unit travels between the first position and the second position. When the tray is present at the third position, the tray gear is apart from the tray rack. Moreover, the rotation body includes a rotation body engagement section which engages with the tray while the tray travels from the third position to a predetermined position. Furthermore, the rotation body further includes a rotation body protrusion which pushes the tray substantially in the same direction as the sliding direction of the tray such that the tray gear engages with the tray rack while the tray is travelling between the third position and the fourth position.

12 Claims, 13 Drawing Sheets

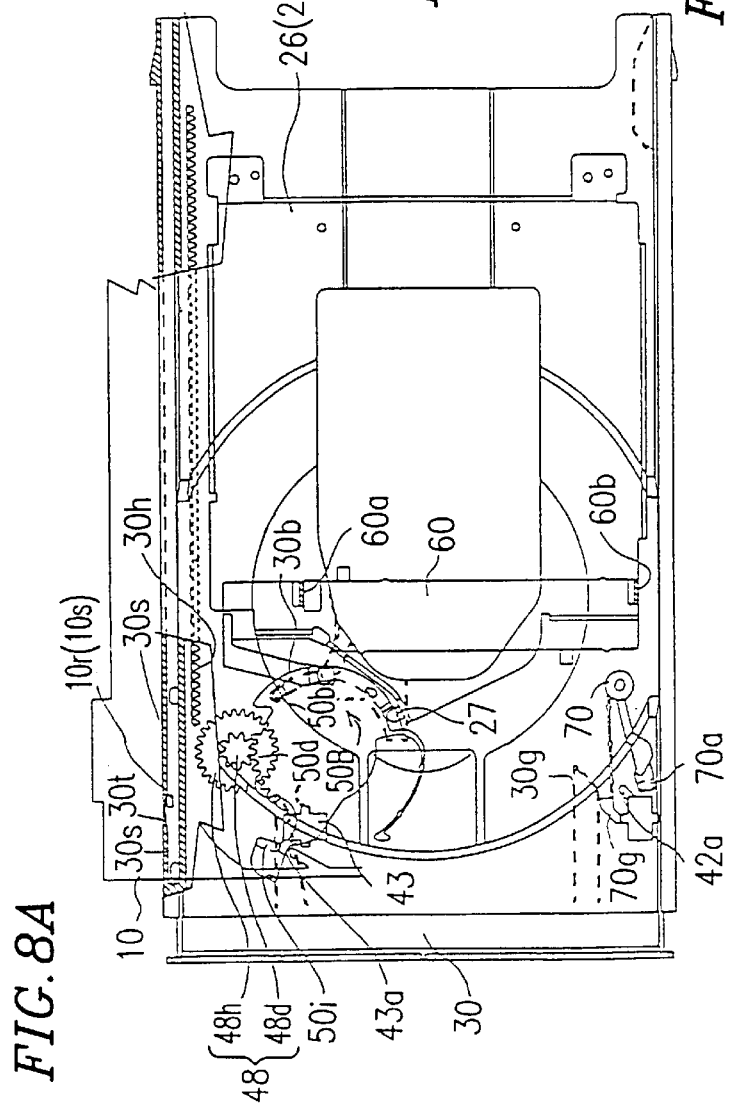
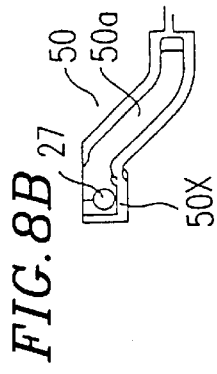
FIG.8B
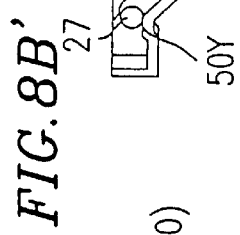
FIG.8B'
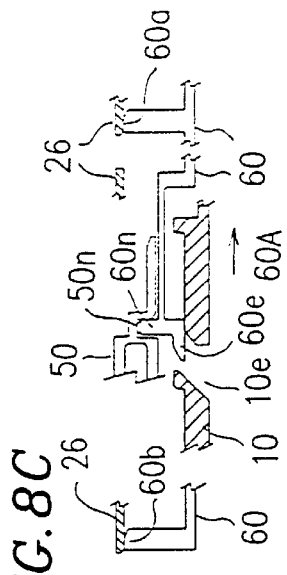
FIG.8C
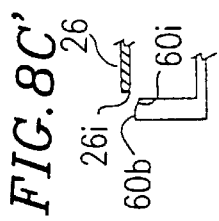
FIG.8C'
FIG.8A

DISK DRIVING APPARATUS

BACKGROUND OF THE INVENTION

1. Field of the Inventioin

The present invention relates to a disk driving apparatus. More particularly, the present invention relates to a disk driving apparatus for recording data in and reproducing data from a disk-type storage medium (hereinafter, simply referred to as "a disk"), the disk driving apparatus having a simple structure for (i) inserting therein and ejecting therefrom a tray on which the disk is placed and (ii) ascending and descending a recording/reproducing head relative to the disk, in connection with the movement of the tray.

2. Description of the Related Art

Current generally used recording/reproduction apparatus for a disk, or a storage medium operates insertion and ejection of the disk as follows. First, the disk is set on a tray projecting out from the apparatus. The tray is then slid into the apparatus, whereby a head base unit supporting a rotation table, a disk motor and an optical head ascends so that the disk is placed on the rotation table. Thus, the disk is separated from the tray and is carried up to an upper position at which recording/reproduction is performed by the optical head. Moreover, the disk is ejected by performing the above-described steps in reversed order.

The above-described disk driving apparatus mainly has two activities, i.e., inserting and ejecting the tray, with or without the disk, into and from the apparatus and ascending and descending the head base unit in connection with the insertion and ejection of the tray.

With the recent remarkable spread of CDs, CD-ROMs and the like, minimization and lower production cost of the disk driving apparatus are greatly demanded. In order to meet such demands, it is necessary to perform the above-described two main activities with a single driving power source.

Japanese Patent Application No. 3-292964 and Japanese Laid-Open Publication No. 5-182335 disclose examples of disk driving apparatuses having such a structure.

Specifically, such a disk driving apparatus generally includes a loading driving power source, a head base unit with a pin provided on its tip, a rotation body having a cam groove that engages with the pin of the head base unit, an intermediate gear which shares a rotating shaft with the rotation body, a planetary gear being engaged with the intermediate gear and supported by the tip of the rotating shaft of the rotation body so as to be revolvable around a sun gear and rotatable on its axis and a tray provided with a U-shaped rack. The rotation body reciprocally rotates so as to ascend and descend the head base unit. The intermediate gear is rotationally driven by the loading driving power source. In the case where the tray is conveyed, the planetary gear rotates along a linear portion of the U-shaped rack. Once the tray reaches the deepest closed position of the apparatus, the planetary gear starts to revolve and rotate, together with the rotation body, along a curved portion of the U-shaped rack. The rotation of the rotation body forces the head base unit to ascend, whereby the disk driving apparatus is ready for recording/reproducing.

Furthermore, a lock structure is also disclosed in the above-mentioned publications which prevents the rotation body from revolving around the sun gear during the conveyance of the tray.

According to the above-described structure, however, the tray may forcibly be halted by an operator or other factors while it is projecting out from the disk driving apparatus, or the tray may forcibly be pulled out from or pushed into the disk driving apparatus. In these cases, no matter how firm the lock for the rotation body is made, the lock of the rotation body may come off. As a result, the rotation body may revolve around the sun gear before the tray reaches the deepest closed position of the disk driving apparatus which, in some cases, results in contact of the head or the rotation table with the tray. Accordingly, there are problems of breaking the head and deteriorating the profile irregularity of the rotating table.

Moreover, according to the above-described structure, the head base unit is supported only at one point where the pin at the tip thereof and the cam groove of the rotation body engage with each other. Therefore, for example, when the disk driving apparatus is dropped on a floor, an impact load on the whole head base unit is concentrated on the single supporting point. As a result, there may also be problems of damage or distortion of the cam groove of the rotation body or the pin of the head base unit.

SUMMARY OF THE INVENTION

According to one aspect of the present invention, a disk driving apparatus includes: a head base unit which supports a head for recording data into and reproducing data from a storage medium, the head base unit being able to travel between a first position where the head is close to the storage medium for recording data thereto and reproducing data therefrom and a second position where the head is apart from the storage medium; a tray provided with a tray rack extending in a predetermined direction, the tray being slidable along the tray rack between a third position at which the head performs recording and reproduction on the storage medium and a fourth position at which an operator can place the storage medium; a driving power source; a tray gear which is driven by the driving power source; a rotation body gear which is driven by the driving power source; a partial gear which partially engages with the rotation body gear at a predetermined angle; and a rotation body which, in accordance with the rotation of the partial gear, reciprocally rotates so that the head base unit travels between the first position and the second position. When the tray is present at the third position, the tray gear is apart from the tray rack. Moreover, the rotation body includes a rotation body engagement section which engages with the tray while the tray travels from the third position to a predetermined position. Furthermore, the rotation body further includes a rotation body protrusion which pushes the tray substantially in the same direction as the sliding direction of the tray such that the tray gear engages with the tray rack while the tray is travelling between the third position and the fourth position.

In one embodiment of the present invention, a ratio of the number of teeth of the tray gear and the number of teeth of the rotation body gear is an integer.

According to another aspect of the present invention, a disk driving apparatus includes: a head base unit which supports a head for recording data into and reproducing data from a storage medium, the head base unit being able to travel between a first position where the head is close to the storage medium for recording data thereto and reproducing data therefrom and a second position where the head is apart from the storage medium; a tray provided with a tray rack extending in a predetermined direction, the tray being slidable along the tray rack between a third position at which the head performs recording and reproduction on the storage medium and a fourth position at which an operator can place the storage medium; a driving power source; a tray gear which is driven by the driving power source; a rotation body gear which is driven by the driving power source; a partial gear which partially engages with the rotation body gear at a predetermined angle; a rotation body which, in accordance with the rotation of the partial gear, reciprocally rotates so that the head base unit travels between the first position and the second position; a rotation body lock portion provided for the rotation body, which locks the rotation movement of the rotation body while maintaining the head base unit at the second position; and an unlock portion provided for the tray, which acts on the rotation body lock portion so as to allow rotation of the rotation body.

In accordance with one embodiment of the present invention, the rotation body lock portion includes an elastic portion integrally provided for the rotation body and a lock detent provided on a tip of the elastic portion, which is detachable from a hook provided for a main body. The unlock portion releases the engagement between the lock detent and the hook by pushing the lock detent while the tray is inserted into the disk driving apparatus.

In accordance with another embodiment of the present invention, the unlock portion rotates the rotation body at the engagement between the tray and the rotation body in a direction where the lock detent departs from the hook, immediately before the locking of the lock detent during the ejection of the tray or immediately before the unlocking of the lock detent during the insertion of the tray.

According to still another aspect of the present invention, a disk driving apparatus includes: a head base unit which supports a head for recording data into and reproducing data from a storage medium, the head base unit being able to travel between a first position where the head is close to the storage medium for recording data thereto and reproducing data therefrom and a second position where the head is apart from the storage medium; a tray provided with a tray rack extending in a predetermined direction, the tray being slidable along the tray rack between a third position at which the head performs recording and reproduction on the storage medium and a fourth position at which an operator can place the storage medium; a rotation body which makes the head base unit travel between the first position and the second position; a rotation plane provided integrally with the rotation body on a plane that intersects with a rotation shaft of the rotation body at right angle; a rotation concave portion provided for part of the rotation plane; a lock concave portion provided for the main body; a head base supporting body which supports the head base unit at the first position; head base supporting faces provided for parts of the head base supporting body and slips under the head base unit, thereby supporting the head base unit at the first position; a lock convex portion provided for the head base supporting body, which has elasticity and is detachable from the lock concave portion of the main body; and a rotation convex portion integrally provided with the lock convex portion, which is detachable from the rotation concave portion of the rotation body. The head base supporting body is resting while the rotation body is rotated so as to make the head base unit travel from the first position to the second position since the rotation convex portion is pushed by the rotation plane and the lock convex portion is engaged with the lock concave portion. When the head base unit completes travelling, the rotation concave portion engages with the rotation convex portion and the head base supporting body travels together with the rotation body so that the head base supporting faces slip under the head base unit, thereby supporting the head base unit.

In accordance with one embodiment of the present invention, the head base supporting faces start to slip under the head base unit while the head base unit is lifted higher than the first position by the rotation body. The head base unit and the rotation body are structured such that after the head base unit is moved by the rotation body and placed on the head base supporting faces, the engagement between the head base unit and the rotation body is released.

In accordance with another embodiment of the present invention, the tray engages with the rotation body at the second position. After making the head base unit travel from the first position to the second position, the rotation body is able to eject the tray for a predetermined distance via the engagement section between the rotation body and the tray. The rotation body is provided with an operation lever which is exposed so as to allow operation thereof from outside the main body. The operation lever is engaged with the main body and has a shape such that force on the main body, which is received from the rotation convex portion caused by elasticity of the head base supporting body is controlled.

In accordance with still another embodiment of the present invention, each of portions of the head base supporting faces where they first slip under the head base unit is provided with a guiding shape.

In accordance with still yet another embodiment of the present invention, each of portions of the head base unit where the head base supporting faces first slip is provided with a guiding shape.

According to still yet another aspect of the present invention, a disk driving apparatus includes: a head base unit which supports a head for recording data into and reproducing data from a storage medium, the head base unit being able to travel between a first position where the head is close to the storage medium for recording data thereto and reproducing data therefrom and a second position where the head is apart from the storage medium; a tray provided with a tray rack extending in a predetermined direction, the tray being slidable along the tray rack between a third position at which the head performs recording and reproduction on the storage medium and a fourth position at which an operator can place the storage medium; a first lateral tray regulating wall provided for the tray in a parallel direction with respect to the sliding direction; a second lateral tray regulating wall provided in a parallel direction with respect to the sliding direction so as to oppose to the first lateral tray regulating wall; a concave shaped tapered regulation releasing portion provided for the second lateral tray regulating wall; a first lateral guiding portion and a second lateral guiding portion provided next to each other in a direction of sliding of the tray, both of the first lateral guiding portion and the second lateral guiding portion making contact with the first lateral tray regulating wall; lateral protrusions which, between the first lateral guiding portion and the second lateral guiding portion, press the first lateral tray regulating wall and the second lateral tray regulating wall against the first lateral guiding portion and the second lateral guiding portion; a driving power source; a tray gear driven by the driving power source; a rotation body gear driven by the driving power source; a partial gear partially engaged with the rotation body gear at a predetermined angle; and a rotation body which reciprocally rotates, in accordance with the rotation of the partial gear so as to make the head base unit travel between the first position and the second position. When the tray is present at the third position, the position of the tapered regulation releasing portion matches with the position of the lateral protrusion so that the pressure of the lateral protrusion on the second lateral tray regulating wall is released. In the ejection step where the rotation body which is rotationally driven by the rotation body gear, makes the tray conveyed forward at the engagement between rotation body and the tray so that the tray rack is engaged with the tray gear, the position of the tapered regulation releasing portion is shifted from the position of the lateral protrusion, immediately before the tray rack is engaged with the tray gear, whereby the lateral protrusion presses the second lateral tray regulating wall.

In accordance with one embodiment of the present invention, a ratio of the number of teeth of the tray gear and the number of teeth of the rotation body gear is an integer.

According to one aspect of the present invention, the tray is resting when the end of the tray rack is separated from the tray gear. Due to the engagement between the rotation body gear and the partial gear partially provided with teeth, the rotation body is rotationally driven by the rotation body gear driven by the driving power source so that the rotation body moves the head base unit from the first position. The rotation protrusion of the rotation body driven by the rotation body gear pushes the tray, thereby engaging the tray rack and the tray gear.

Due to the engagement between the tray rack and the tray gear, the tray is driven by the tray gear and starts to move. The rotation body is driven, at the rotation body protrusion engaging with the tray and the partial gear partially provided with teeth, by both the tray and the rotation body.

The rotation body is separated from the rotation body gear and is driven only by the tray at the rotation body protrusion. The engagement between the rotation body and the tray is released, whereby only the tray is ejected to the fourth position by the tray gear.

Therefore, when the tray is projecting out from the apparatus, the rotation body gear of the tray driving system is separated from the rotation body. Accordingly, even when the tray is forcibly halted by an operator or other factors while it is projecting out from the disk driving apparatus, or the tray is forcibly pulled out from or pushed into the disk driving apparatus, the rotation body for ascending and descending the head base unit is not affected at all and stays at the predetermined position.

According to another aspect of the present invention, the tray is resting when the end of the tray rack is separated from the tray gear. Due to the engagement between the rotation body gear and the partial gear partially provided with teeth, the rotation body is rotationally driven by the rotation body gear driven by the driving power source so that the rotation body moves the head base unit from the first position. The rotation protrusion of the rotation body driven by the rotation body gear pushes the tray, thereby engaging the tray rack and the tray gear.

Due to the engagement between the tray rack and the tray gear, the tray is driven by the tray gear and starts to move. The rotation body is driven, at the rotation body protrusion engaging with the tray and the partial gear partially provided with teeth, by both the tray and the rotation body.

The rotation body is separated from the rotation body gear and is driven only by the tray at the rotation body protrusion. The rotation body lock portion holds the rotation movement of the rotation body.

The engagement between the rotation body and the tray is released, whereby only the tray is ejected to the fourth position by the tray gear.

According to still another aspect of the present invention, during the process of moving the head base unit to the second position by the rotation body, the rotation convex portion is pushed by the rotation plane and the lock convex portion is engaged with the lock concave portion. Thus, the head base unit supporting body is resting.

The rotation concave portion engages with the rotation convex portion when the head base unit is completely transferred. The head base supporting body travels together with the rotation body. The head base supporting faces slip under the head base unit, whereby the head base supporting body supports the head base unit.

Therefore, the head base supporting body which is intermittently engaged to be driven by the rotation body supports the head base unit by two supporting faces thereof, thereby increasing the area for supporting the head base unit. Accordingly, damage caused by impact on the disk driving apparatus (e.g., dropping on the floor) can be greatly minimized.

According to still yet another aspect of the present invention, when the tray is present at the third position, the position of the tapered regulation releasing portion is matched with the position of the lateral protrusion. The pressure of the lateral protrusion on the second lateral tray regulating wall is released.

When the rotation body which is rotationally driven by the rotation body gear moves the tray to the fourth position at the engagement section therebetween, the tray rack engages with the tray gear. The position of the tapered regulation releasing portion is shifted from the position of the lateral protrusion immediately before the tray rack engages the tray gear. As a result, the lateral protrusion presses the second lateral tray regulating wall.

Accordingly, lateral vibration of the tray during the ejection of the tray can be decreased. As a result, the end tooth of the tray rack can be engaged with the correct tooth of the tray gear, thereby realizing stable traveling of the tray.

Thus, the invention described herein makes possible the advantage of providing a disk driving apparatus in which an ascending/descending activities of the head base unit are not affected even if the tray projecting out from the disk driving apparatus is roughly operated, and the head base unit or a rotation body are not damaged or distorted by impact on the disk driving apparatus, for example, by being dropped.

These and other advantages of the present invention will become apparent to those skilled in the art upon reading and understanding the following detailed description with reference to the accompanying figures.

BRIEF DESCRIPTION OF THE DRAWINGS

FIGS. 8A through 8C are views showing the disk driving apparatus according to one embodiment of the present invention in an initial state of an ejection operation;

FIGS. 8B' and 8C' are views showing the disk driving apparatus according to one embodiment of the present invention in one state of the ejection operation;

DESCRIPTION OF THE PREFERRED EMBODIMENTS

Hereinafter, a disk driving apparatus which is assembled according to one embodiment of the present invention will be described with reference to FIGS. 1, 2 and 3.

Figure 2:
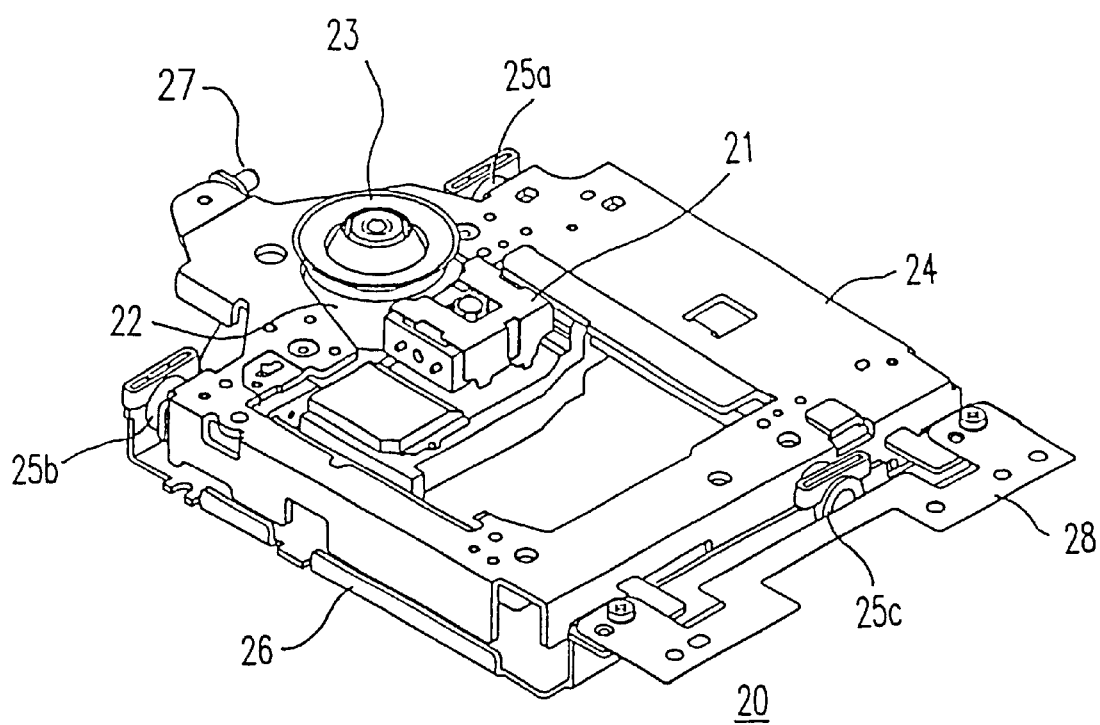
FIG. 2 is a perspective view showing the structure of a head base unit of the disk driving apparatus according to one embodiment of the present invention.

FIG. 2 is a perspective view showing a head base unit 20 of the disk driving apparatus according to one embodiment of the present invention. The head base unit 20 includes an optical head 21, a disk motor 22, a rotation table 23 affixed to a rotating shaft of the disk motor 22, a first head base 24, a second head base 26, a cylindrical pin 27 affixed to the second head base 26 by caulking or the like and an elastic body 28, preferably formed of a leaf spring, attached to the second head base 26. The first head base 24 supports the optical head 21, the disk motor 22, the rotation table 23 and other mechanisms for transferring the optical head 21. The second head base 26 supports the first head base 24 via vibration absorbing materials 25a and 25b.

Figure 3:
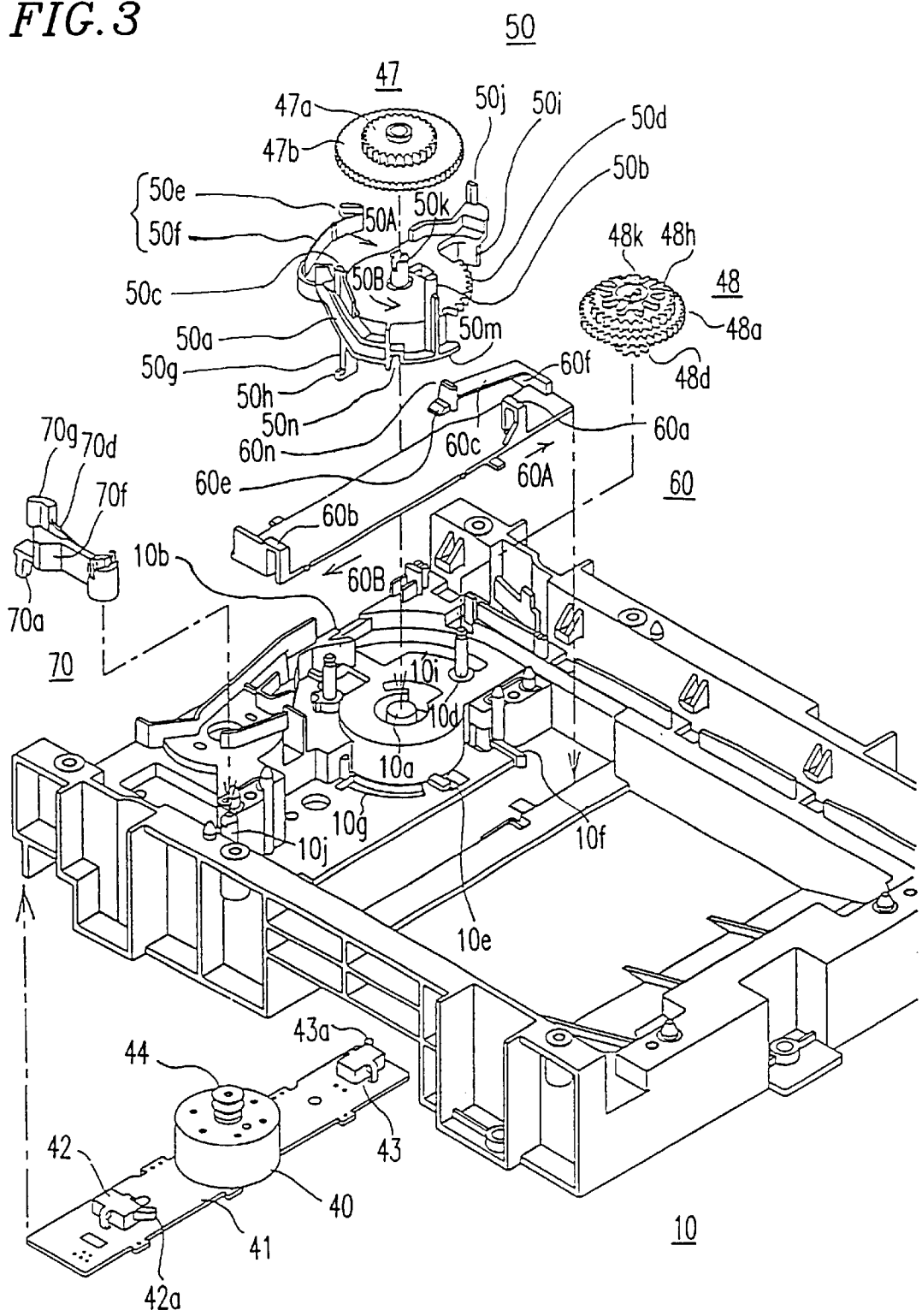
FIG. 3 is a perspective view showing the structure of loading parts of the disk driving apparatus according to one embodiment of the present invention.

FIG. 3 is a perspective view showing a main body 10 as a base of the disk driving apparatus according to one embodiment of the present invention. The main body 10 includes a motor 40 as a loading driving power source, a detector 42 for detecting ejection of a tray, a a detector 43 for detecting ascent of the head base unit 20 to an upper position, a motorized pulley 44 affixed to a rotation shaft of the motor 40, a printed wiring board 41 having wiring patterns for the motor 40, the detector 42 and the detector 43. The printed wiring board 41 is attached to a bottom surface of the main body 10.

FIG. 3 further shows a rotation body 50 which is rotatably attached to a shaft 10a of the main body 10. The rotation body 50 includes a cam groove 50a, a synchronous protrusion 50b, a rotation protrusion 50c, a partial gear 50d partially provided with teeth for a predetermined angle with respect to the rotation shaft of the rotation body 50, a lock detent 50e which engages with a hook 10b of the main body 10, an elastic portion 50f which can bend such that the lock detent 50e can move toward a direction indicated by an arrow 50A so as to be released from the hook 10b. The lock detent 50e and the elastic portion 50f form a lock section of the rotation body 50.

The rotation body 50 further includes an operation lever 50g exposing at the bottom surface of the main body 10 through an opening 10g, which can be held by an operator. The operation lever 50g has a hook 50h which hooks onto the bottom surface of the main body 10, thereby preventing unsteadiness of the rotation body 50 in an upward direction. Moreover, the rotation body 50 includes a protrusion 50i exposing at the bottom surface of the main body 10 through an opening 10i. The protrusion 50i pushes a lever 43a of the detector 43 when the rotation body 50 rotates in a direction indicated by an arrow 50B and detects a position for the rotation to stop. A rotation plane 50m and a rotation concave portion 50n following the rotation plane 50m are also included in the rotation body 50. The height of the rotation plane 50m remain unchanged during the rotation of the rotation body 50.

An intermediate gear 47 is rotatably attached to a shaft 50k of the rotation body 50. A gear 48 is rotatably attached to a shaft 10d of the main body 10. A rotation body gear 48d meshes with the gear 50d on occasion. A transmission gear 48a of the gear 48 meshes with a transmission gear 47a of the intermediate gear 47. Herein, the number of teeth of a tray gear 48h is n (where n is an integer) times that of the teeth of the rotation body gear 48d.

A head base supporting body 60 (FIG. 3) is slidably (in directions indicated by arrows 60A and 60B) attached to the main body 10. Head base supporting faces 60a and 60b support the bottom surface of the second head base 26 of the head base unit 20 (FIG. 2) when the head base supporting body 60 slides in the direction indicated by the arrow 60A. A rotation convex portion 60n fits the rotation concave portion 50n of the rotation body 50. A lock convex portion 60e fits a lock concave portion 10e of the main body 10.

The rotation convex portion 60n and the lock convex portion 60e are supported by an elastic portion 60c. The sliding of the head base supporting body 60 in the direction indicated by the arrow 60B is regulated by the contact between a regulating face 60f of the head base supporting body 60 and the regulating face 10f of the main body 10.

An ejection lever 70 is rotatably attached to a shaft 10j of the main body 10. A protrusion 70a is exposed at the bottom surface of the main body 10 through an opening (not shown) of the main body 10. The protrusion 70a pushes the lever 42a of the detector 42 when the ejection lever 70 is rotated.

Figure 1:
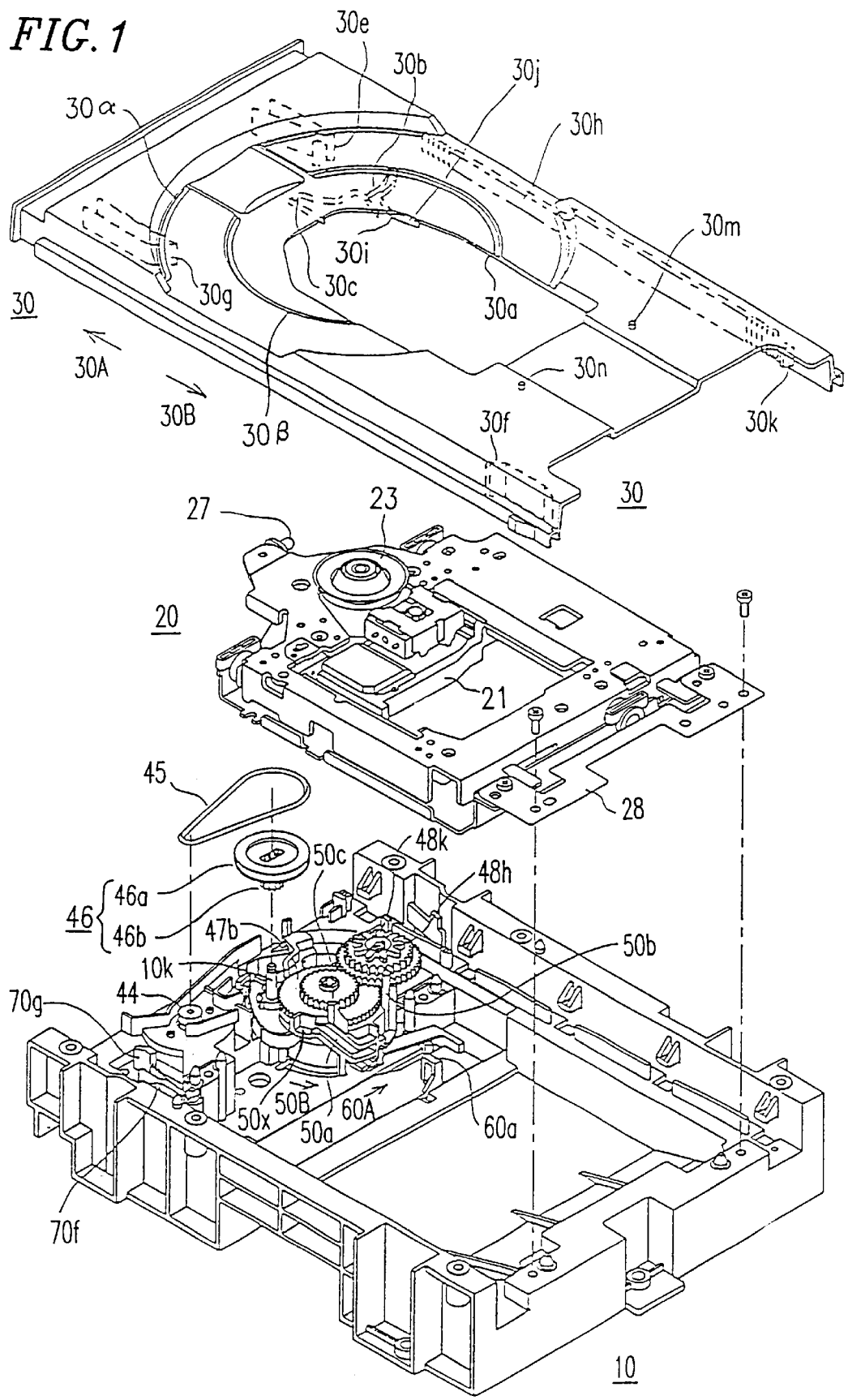
FIG. 1 is a perspective view showing the general structure of a disk driving apparatus according to one embodiment of the present invention.

Referring to FIG. 1, a belt 45 made of an elastic material such as rubber has one end hooked onto the motorized pulley 44. A pulley gear 46 includes a pulley portion 46a onto which the belt 45 is hooked and a gear 46b engaging with the transmission gear 47b of the intermediate gear 47. The pulley gear 46 is rotatably attached to a shaft 10k of the main body 10. The rotation driving force of the motor 40 (FIG. 3) is sequentially transmitted to the motor pulley 44, the belt 45, pulley gear 46, the intermediate gear 47 and the gear 48 in this order.

As shown in FIG. 1, the head base unit 20 is affixed to the main body 10 by the elastic body 28. The pin 27 engages with the cam groove 50a of the rotation body 50. When the rotation body 50 is fully rotated in the direction indicated by the arrow 50B (FIGS. 1 and 3) so that the protrusion 50i of the rotation body 50 pushes the lever 43a of the detector 43, the rotation convex portion 60n of the head base supporting body 60 (FIG. 3) fits in the rotation concave portion 50n of the rotation body 50. Accordingly, the lock convex portion 60e of the head base supporting body 60 comes off from the lock concave portion 10e of the main body 10. In this condition, the head base supporting body 60 is at a position where it has been fully slid in the direction indicated by the arrow 60A.

As a result, the head base unit 20 is supported at the upper position by the head base supporting faces 60a and 60b. At this time, the pin 27 stays in an indented portion 50x (FIG. 1) of the cam groove 50a, whereby the pin 27 does not touch the cam groove 50a.

A tray 30 is shown in FIG. 1 which is conveyed in a sliding manner in the direction indicated by the arrow 30A to a full ejection position at which an operator places a disk or in the direction indicated by the arrow 30B to a deepest closed position of the disk driving apparatus at which data is recorded into or reproduced from the disk. The tray 30 can accommodate disks of different sizes on circle grooves 30α and 30β. When the head base unit 20 is at the upper position, the rotation table 23, the optical head 21 and the like are exposed through the opening 30a.

FIG. 1 shows rib portions protruding from the bottom surface. of the tray 30, namely, an unlock portion 30e, an ejecting portion 30f and a lever returning portion 30g.

While the tray 30 is being inserted into the disk driving apparatus, the unlock portion 30e pushes the lock detent 50e in the direction indicated by the arrow 50A so that the lock detent 50e of the rotation body is separated from the hook 10b of the main body 10.

While the tray 30 is being ejected from the disk driving apparatus, the ejecting portion 30f pushes a protrusion 70f of the ejection lever 70 so as to rotate the ejection lever 70. As a result, the protrusion 70a pushes the lever 42a of the detector 42, thereby detecting the full ejection position of the tray 30.

While the tray is being inserted into the disk driving apparatus, the lever returning portion 30g pushes a tip 70g of the ejection lever 70 so as to rotate the ejection lever 70. As a result, release of pressure of the protrusion 70a on the lever 42a of the detector 42 is ensured.

Moreover, a tray rack 30h projecting from the bottom surface of the tray 30 has teeth which engage with the tray gear 48h of the gear 48. Rib portions protruding from the bottom surface of the tray 30, namely, a regulating portion 30j, an overshoot protrusion 30i, a synchronous cam 30b and an tray protrusion 30c, engage with the synchronous protrusion 50b and the rotation protrusion 50c, thereby forming an engagement section between the tray 30 and the rotation body 50.

The regulating portion 30j regulates the synchronous protrusion 50b such that the rotation body 50 does not rotate in the direction indicated by the arrow 50B when the unlock portion 30e unlocks the lock detent 50e of the rotation body from the hook 10b while the tray 30 is being inserted into the disk driving apparatus.

The overshoot protrusion 30i pushes, immediately before the lock detent 50e is separated from the hook 10b, the synchronous protrusion 50b so that the rotation body 50 rotates in a direction where the lock detent 50e is slightly separated from the hook 10b.

The synchronous cam 30b accommodates the synchronous protrusion 50b while the rotation body 50 is rotating in the direction indicated by the arrow 50B.

The tray protrusion 30c is pushed by the rotation protrusion 50c in the direction indicated by the arrow 30A while the rotation body 50 which is engaged with the gear 48 is rotated in a direction indicated by the arrow 50B.

In such a manner, the tray 30 is conveyed forward, whereby the tray rack 30h engages with the tray gear 48h.

As shown in FIG. 1, stoppers 30m and 30n project from the upper surface of the tray 30, thereby preventing a disk or other foreign matter from being inserted into the disk driving apparatus while the tray 30 is projecting out from an opening (not shown) of the disk driving apparatus.

There is only one correct phase for satisfying the engagements between (i) the gear 48 and the rotation body 50, (ii) the rotation body 50 and the tray 30 and (iii) the tray 30 and the gear 48. When the number of the teeth of the tray gear 48h is three times that of the rotation body gear 48d, there are three phases for the gear 48 and the tray 30. Thus, when assembling the tray 30, the correct phase should be selected for engaging the teeth of the tray gear 48h and the teeth of the tray rack 30h.

As shown in FIG. 3, the gear 48 is provided with a synchronous gear 48k which includes a number of teeth equal to the number of teeth in the rotation body gear 48d. The tray rack 30h is provided with a synchronous rack 30k. As a result, when the tray 30 is inserted into the disk driving apparatus in a direction indicated by an arrow 30B, the synchronous rack 30k engages with the synchronous gear 48k so that the end tooth of the tray rack 30h is engaged with the correct tooth of the tray gear 48h, thereby performing correct phase alignment of the gear 48 and the tray 30.

Figure 4:
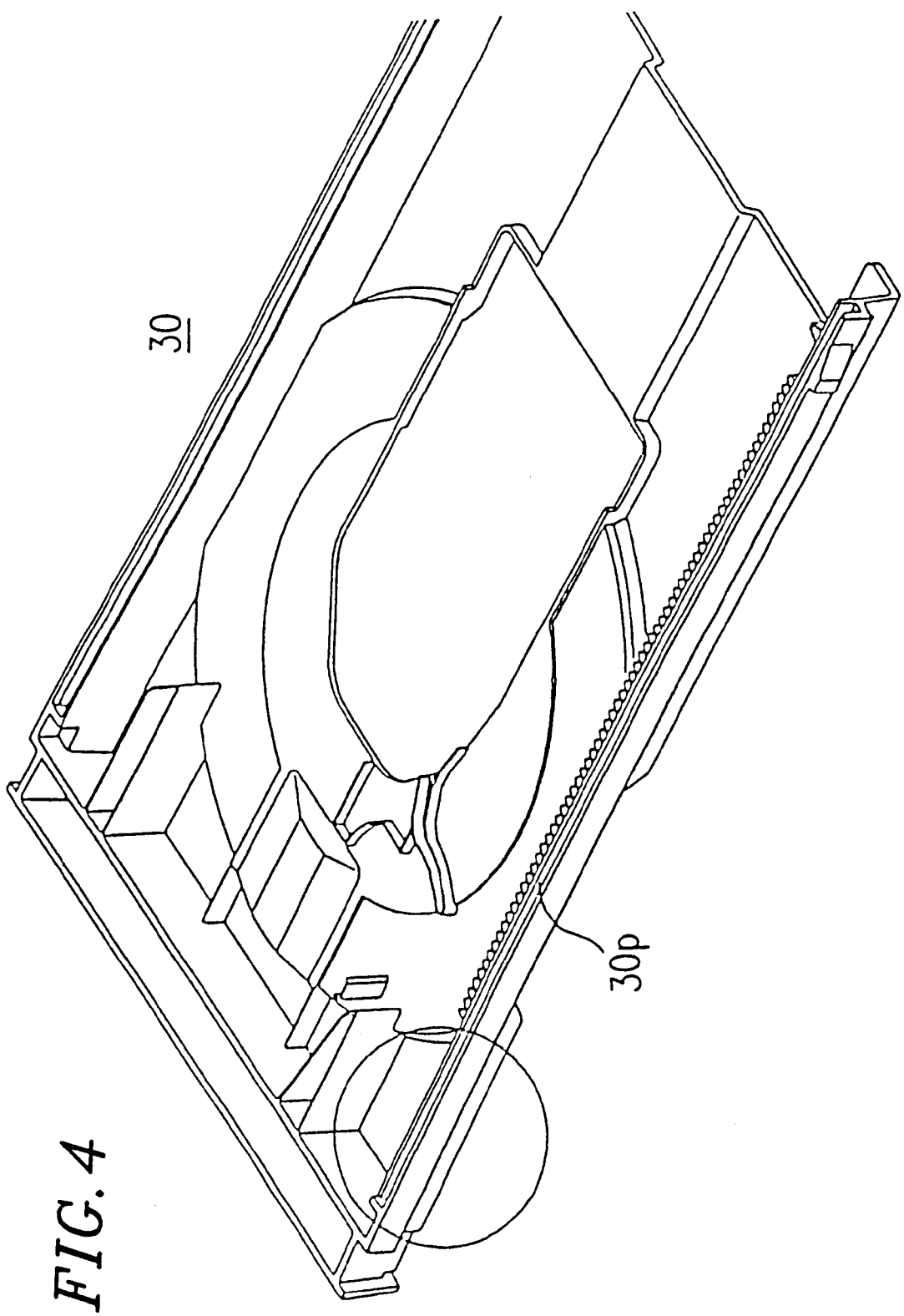
FIG. 4 is a perspective view showing a bottom surface of a tray of the disk driving apparatus according to one embodiment of the present invention.
Figure 5:
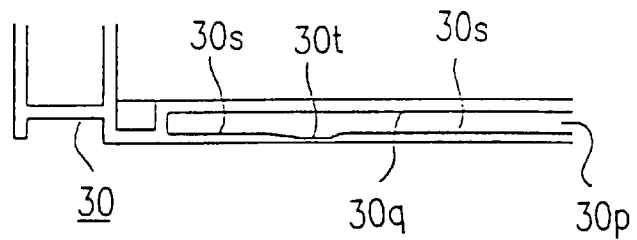
FIG. 5 is a plan view showing in detail a shape of a front portion of a guiding groove of the tray of the disk driving apparatus according to one embodiment of the present invention.

Hereinafter, engagement between the main body 10 and the tray 30 will be described with reference to FIGS. 4 to 7. FIG. 4 is a perspective view showing the bottom surface of the tray 30. FIG. 5 is an enlarged plan view of the encircled portion of FIG. 4, i.e., an outer ejection portion of a guiding groove 30p provided along the sliding direction of the tray 30, seen from the bottom surface of the tray 30. The front portion of the guiding groove 30p includes a first lateral tray regulating wall 30q, a second lateral tray regulating wall 30s provided so as to be opposed to and in parallel with the first lateral tray regulating wall 30q and a tapered regulation releasing portion 30t provided for the second lateral tray regulating wall 30s.

Figure 6:
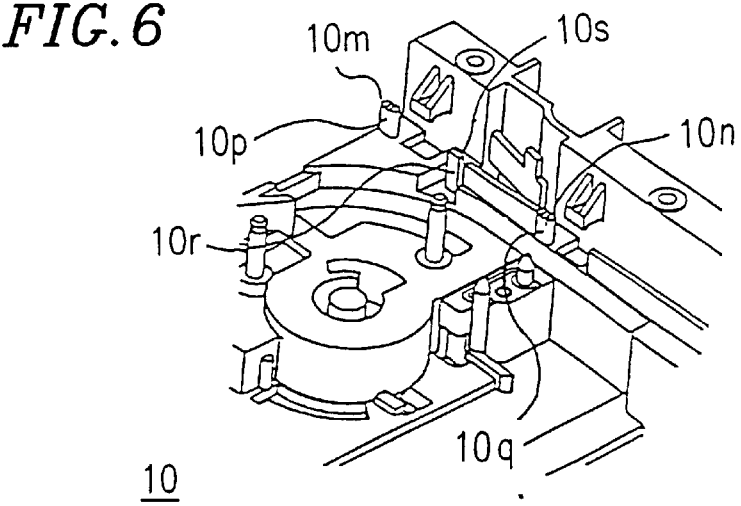
FIG. 6 is a perspective view showing a main body of the disk driving apparatus according to one embodiment of the present invention.

FIG. 6 is a perspective view showing the main body 10. Guiding protrusions 10m and 10n have first and second lateral guiding portions 10p and 10q, respectively. The first and second lateral guiding portions 10p and 10q make contact with the first lateral tray regulating wall 30q of the tray 30. A lateral protrusion 10r which is made thin so as to have some resilience and act like a spring, includes a lateral surface 10s (not visible in FIG. 6) which presses the second lateral tray regulating wall 30s.

Figure 7:
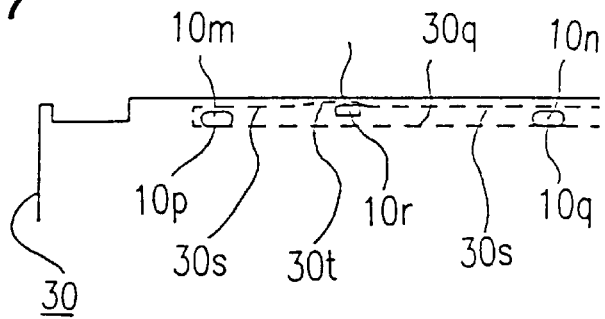
FIG. 7 is a plan view showing an engagement between the main body and the tray of the disk driving apparatus according to one embodiment of the present invention.

FIG. 7 is a perspective view showing the above-described front portion of the guiding groove 30p where the tray 30 is inserted at the deepest closed position of the disk driving apparatus, seen from the upper surface of the tray 30. In this state, the position of the tapered regulation releasing portion 30t is matched with the position of the lateral protrusion 10r. The pressure of the lateral surface 10s on the second tray regulating side wall 30s is released.

Hereinafter, operation of the disk driving apparatus according to one embodiment of the present invention will be described with reference to the accompanying drawings.

FIGS. 8A, 9A, 10A, 11A, 12 and 13 are plan views showing the general structure of the disk driving apparatus in various states; FIGS. 8B, 9B, 10B, and 11B in various states, corresponding to FIGS. 8A, 9A, 10A, and 11A, are partial plan views showing the relationship between the rotating body 50 and the pin 27; and FIGS. 8C, 9C, 10C, and 11C in various states, corresponding to FIGS. 8A, 9A, 10A, and 11A, are partial plan views showing the relationship among the head base supporting body 60, the rotation body 50 and the second head base 26.

Figure 11A:
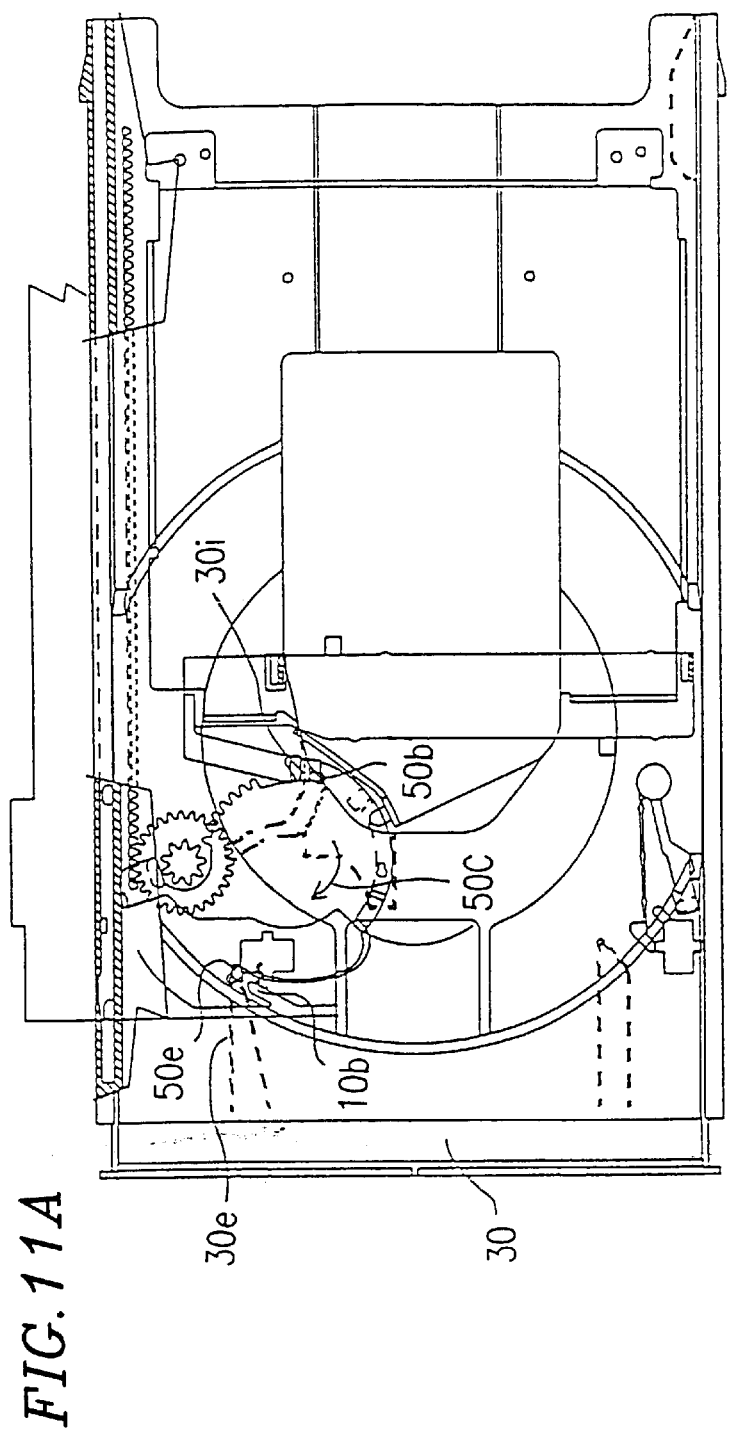
FIGS. 11A through 11C are views showing the disk driving apparatus according to one embodiment of the present invention in a fourth state of the ejection operation.
Figure 11C:
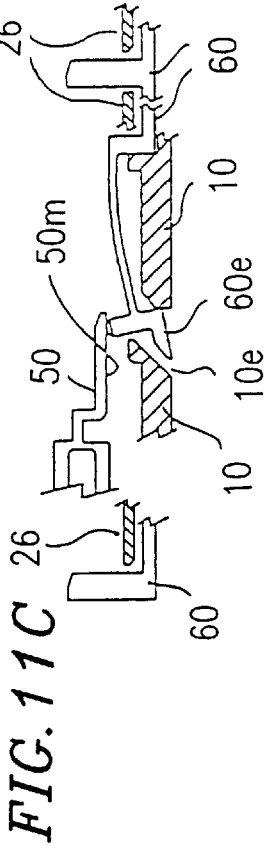
Figure 11B:
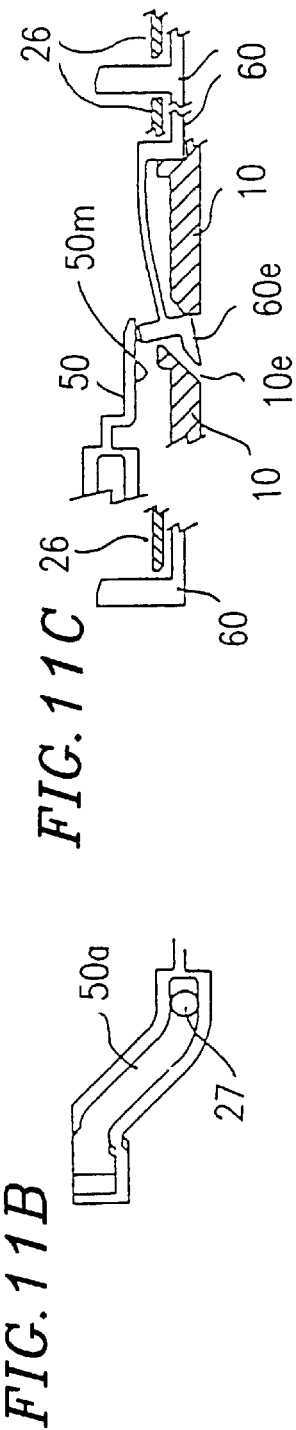
Figure 14:
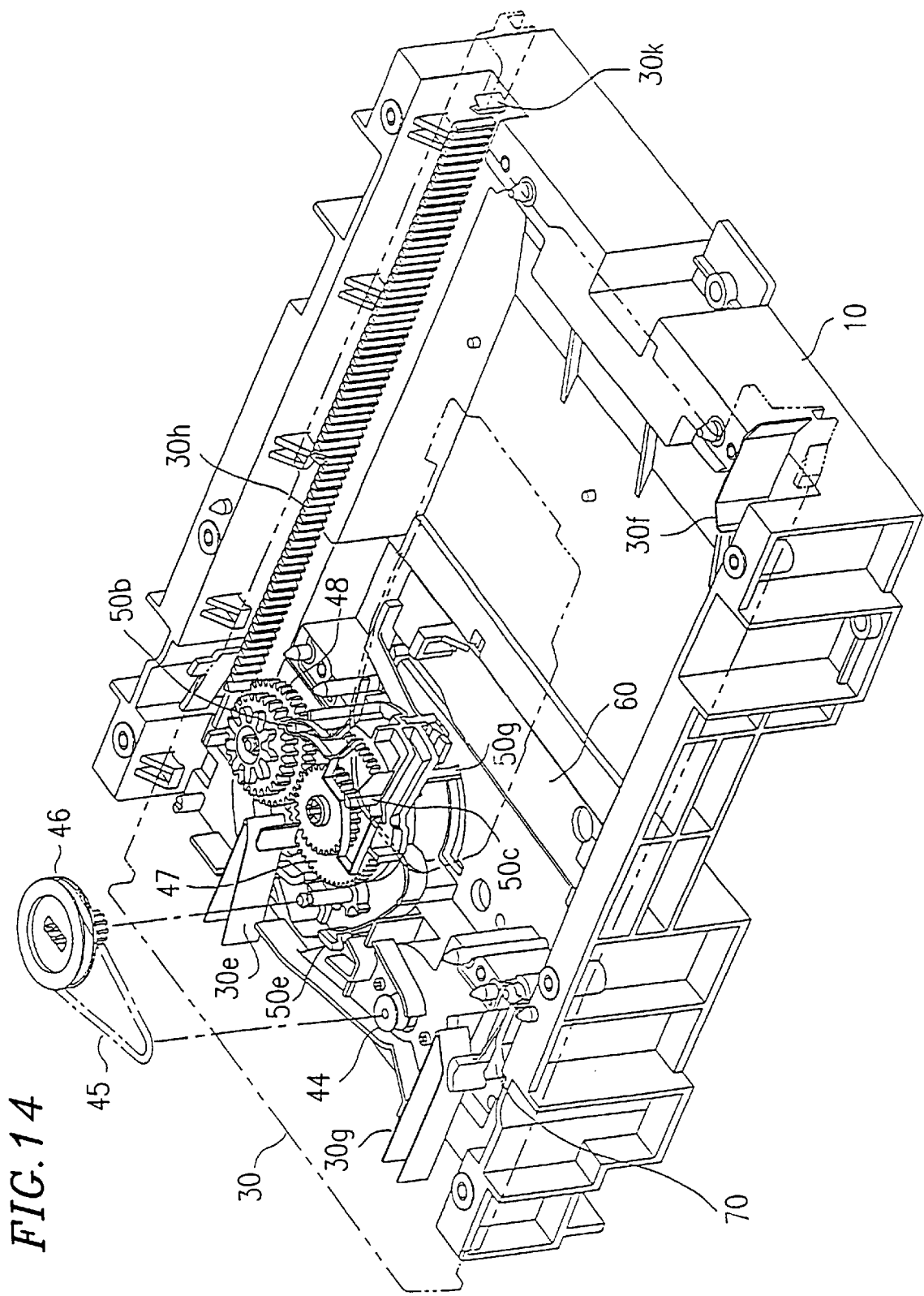
FIG. 14 is a perspective view showing the disk driving apparatus according to one embodiment of the present invention in the initial state of the ejection operation.
Figure 15:
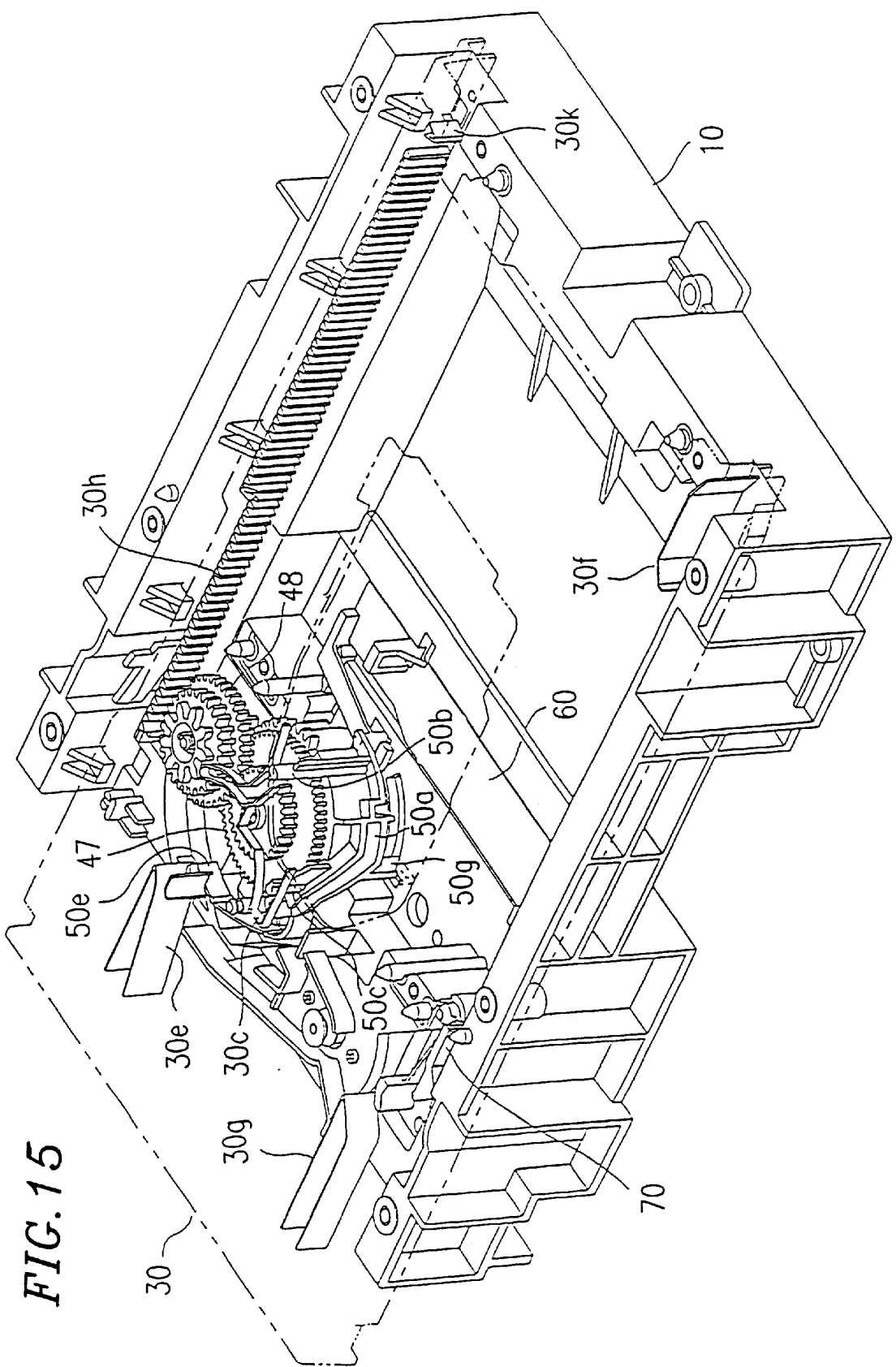
FIG. 15 is a perspective view showing the disk driving apparatus according to one embodiment of the present invention in the fourth state of the ejection operation.

Furthermore, FIG. 14 is a perspective view showing the disk driving apparatus at the position shown in FIGS. 8A through 8C; and FIG. 15 is a perspective view showing the disk driving apparatus at the position shown in FIGS. 11A through 11C. Both FIGS. 14 and 15 show how parts of the bottom surface of the tray 30 are engaged with the other constituting parts.

FIGS. 8A through 8C and 14 show the disk driving apparatus in the initial, closed state. As shown in FIG. 8A, the tray 30 is at the deepest closed position, whereby the tray rack 30h is separated from the tray gear 48h of the gear 48 and the position of the tapered regulation releasing portion 30t matches with the position of the lateral protrusion 10r. Therefore, the pressure of the lateral surface 10s on the second tray regulating side wall 30s is released.

The rotation body 50 is at a position where the partial gear 50d partially provided with teeth is fully rotated in the direction indicated by the arrow 50B while being engaged with the rotation body gear 48d. The synchronous protrusion 50b is accommodated by the synchronous cam 30b at the deepest closed position thereof. The protrusion 50i is pushing a lever 43a of the detector 43, thereby detecting a position for the rotation in a direction indicated by an arrow 50B to stop.

As shown in FIG. 8C, the rotation convex portion 60n of the head base supporting body 60 is fitted into the rotation concave portion 50n of the rotation body 50. Thus, the lock convex portion 60e is moved in the direction indicated by the arrow 60A and released from the lock concave portion 10e of the main body 10.

The head base supporting faces 60a and 60b of the head base supporting body 60 support the bottom surface of the second head base 26 of the head base unit 20 (FIG. 2). On the other hand, as shown in FIG. 8B, the pin 27 stays in the indented portion 50x of the cam groove 50a. Therefore, the pin 27 does not touch the cam groove 50a. The tip 70g of the ejection lever 70 is regulated by the lever returning portion 30g (FIG. 8A) such that the pressure of the protrusion 70a of the ejection lever 70 on the lever 42a of the detector 42 is released.

Figure 9A:
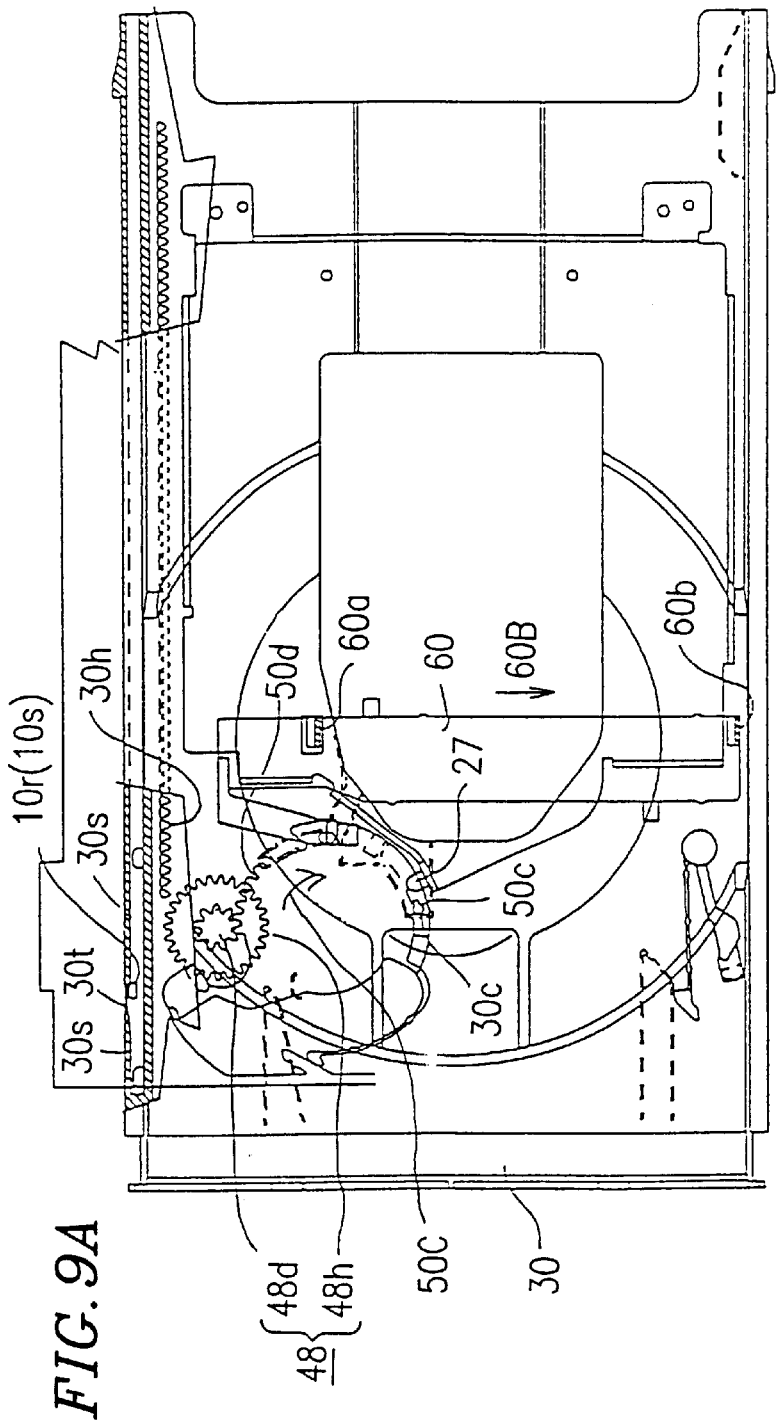
FIGS. 9A through 9C are views showing the disk driving apparatus according to one embodiment of the present invention in a first state of the ejection operation.

As shown in FIG. 9A, when the gear 48 causes the rotation body 50 to rotate in a direction indicated by an arrow 50C such that the rotation protrusion 50c touches the tray protrusion 30c, the head base supporting body 60 moves in a direction indicated by an arrow 60B. As a result, as shown in FIG. 9C, the head base supporting faces 60a and 60b slide transversely so that they no longer support the bottom surface of the second head base 26. Furthermore, the lock convex portion 60e is guided into the lock concave portion 10e of the main body 10, and the rotation convex portion 60n is pressed by the rotation plane 50m, whereby the lock convex portion 60e is caught in the lock concave portion 10e.

At the same time, as shown in FIG. 3, the regulating face 60f of the head base supporting body 60 touches the regulating face 10f of the main body 10. The head base supporting body 60 stays at this position.

Figure 9B:
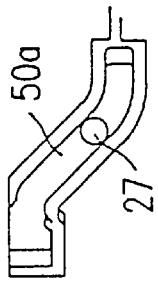
Figure 9C:
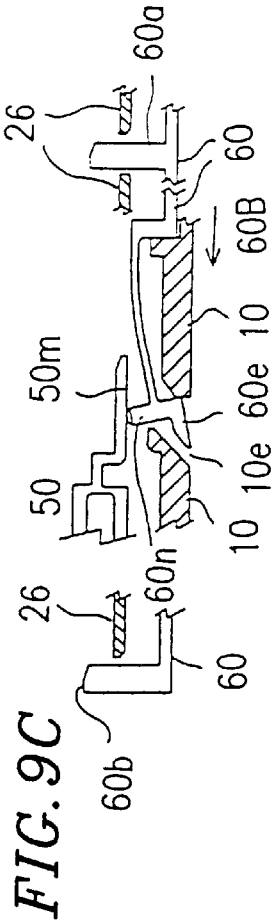

As shown in FIG. 9B, the pin 27 of the head base unit 20 descends within the cam groove 50a since rotation of the rotation body 50 causes the cam groove 50a to move. At this point, the head base unit 20 is supported only by the pin 27 (the first ejection state).

Figure 10A:
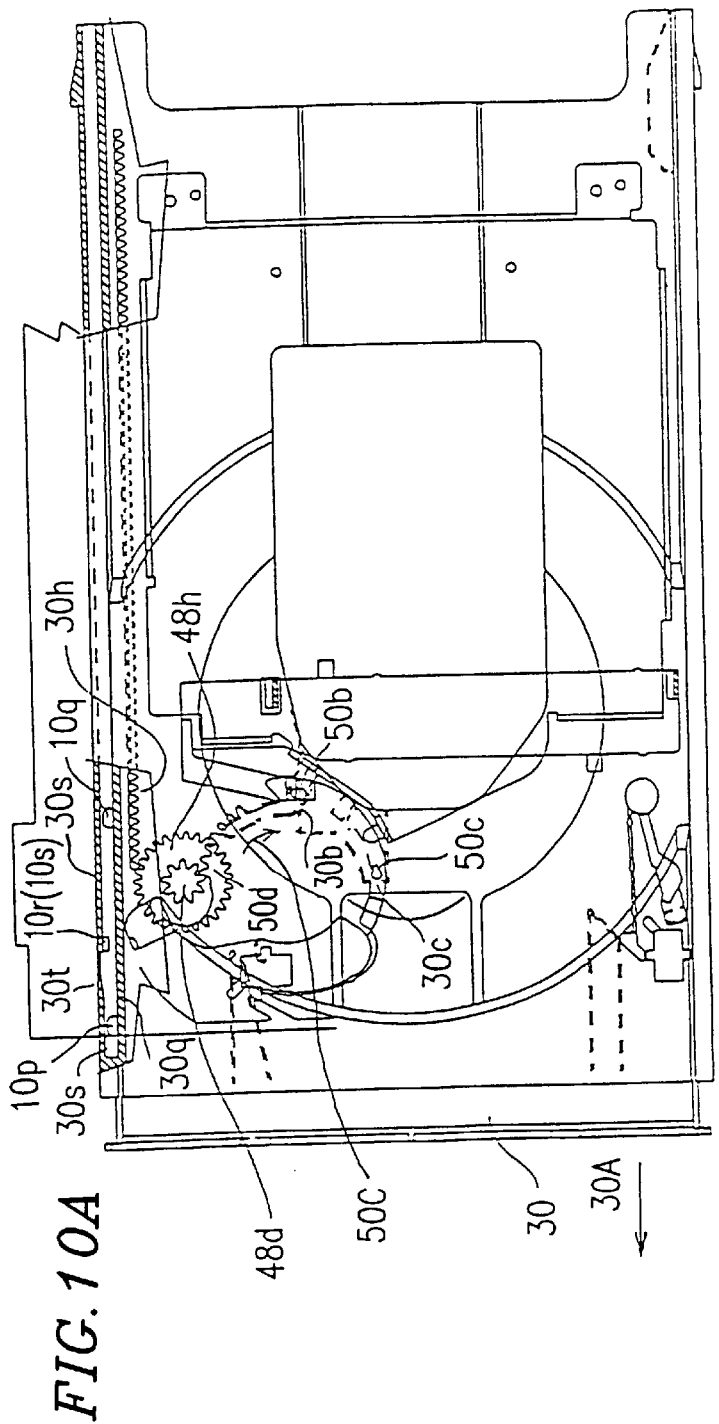
FIGS. 10A through 10C are views showing the disk driving apparatus according to one embodiment of the present invention in a second state of the ejection operation.

Next, as shown in FIG. 10A, the tray 30 is moved in a direction indicated by an arrow 30A to a position where the rotation protrusion 50c makes contact with the tray protrusion 30c and the teeth of the tray rack 30h projecting from the bottom surface of the tray 30 engage with the tray gear 48h of the gear 48. In this case, the rotation protrusion 50c is moved substantially in the same direction as the direction of ejection of the tray 30. Thus, the tray 30 can be correctly conveyed such that the correct tooth of the tray gear 48h engages with the end tooth of the tray rack 30h.

Furthermore, since the lateral protrusion 10r becomes offset from the tapered regulation releasing portion 30t, the second lateral tray regulating wall 30s is pressed by the lateral surface 10s. The first and second lateral guiding portions 10p and 10q make contact with the first lateral tray regulating wall 30q of the tray 30, whereby the tray 30 is made steady with respect to the main body 10.

Figure 10C:
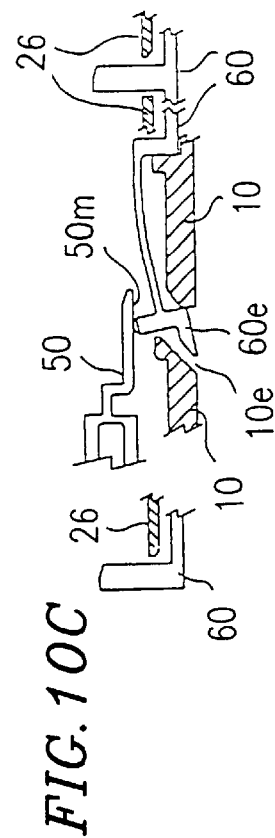
Figure 10B:
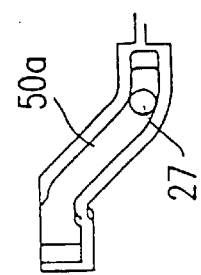

As shown in FIG. 10B, the pin 27 further descends within the cam groove 50a due to the further move of the cam groove 50a. As shown in FIG. 10C, the lock convex portion 60e of the head base supporting body 60 continues to stay within the lock concave portion 10e of the main body 10 (the second ejection state).

Before referring to FIG. 11A, there are two more states. First, the tray 30 driven by the gear 48 (at the engagement between the tray rack 30h and the tray gear 48h) starts moving in the direction indicated by the arrow 30A. As a result, the rotation body 50 is rotationally driven in the direction indicated by the arrow 50C at the synchronous cam 30b of the tray 30 and the synchronous protrusion 50b of the rotation body 50. The rotation body 50 is also driven at the partial gear 50d partially provided with teeth by the rotation body gear 48d. Accordingly, the rotation body 50 is driven by both the tray 30 and the gear 48 until the partial gear 50d partially provided with teeth is separated from the rotation body gear 48d (the third ejection state).

Subsequently, the rotation body 50 is separated from the gear 48. The synchronous protrusion 50b of the rotation body 50 is pushed by the synchronous cam 30b of the tray 30. The rotation body 50 is rotationally driven only by the tray 30 in the direction indicated by the arrow 50C (the fourth ejection state).

Next, as shown in FIGS. 11A and 15, synchronous protrusion 50b of the rotation body 50 is pushed by the overshoot protrusion 30i of the tray 30 in the direction indicated by the arrow 50C. The lock detent 50e slightly exceeds from a position where it engages with the hook 10b of the main body 10 (so that the lock detent 50e and the hook 10b do not engage with each other in the next step when the lock detent 50e is separated from the unlock portion 30e). As shown in FIG. 11B, the pin 27 is fully descended to the lowest position within the cam groove 50a. Accordingly, the head base unit 20 is descended to the lower position.

Figure 12:
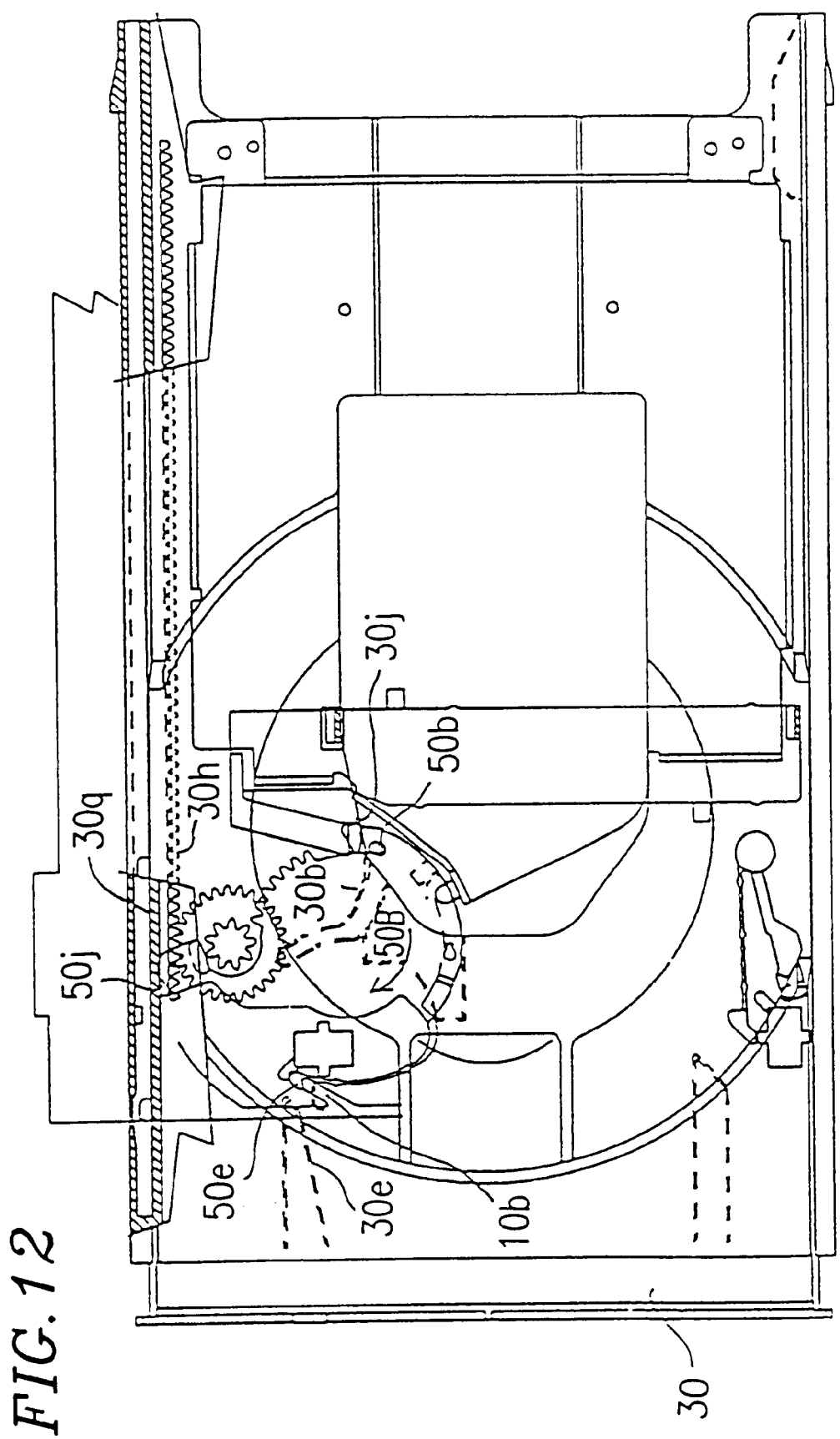
FIG. 12 is a plan view showing the disk driving apparatus according to one embodiment of the present invention in a fifth state of the ejection operation.

As shown in FIG. 12, as the tray 30 is further moved forward, the synchronous protrusion 50b of the rotation body 50 and the synchronous cam 30b of the tray 30 are released from each other, whereby the rotation body 50 completely stops. Since the unlock portion 30e of the tray 30 is separated from the lock detent 50e, the lock detent 50e completely hooks onto the hook 10b of the main body 10. Thereafter, only the tray 30 is ejected to the full ejection position by the gear 48.

The regulating portion 30j extending from the synchronous cam 30b is present next to the synchronous protrusion 50*b* which prevents the rotation body 50 from rotating in the direction indicated by the arrow 50B until the lock detent 50*e* is completely hooked onto the hook 10*b*. A protrusion 50*j* of the rotation body 50 fits into a groove formed between the tray rack 30*h* and the first lateral tray regulating wall 30*q* so as to prevent the rotation body 50 from rotating during the ejection of the tray 30 (the fifth ejection state).

Figure 13:
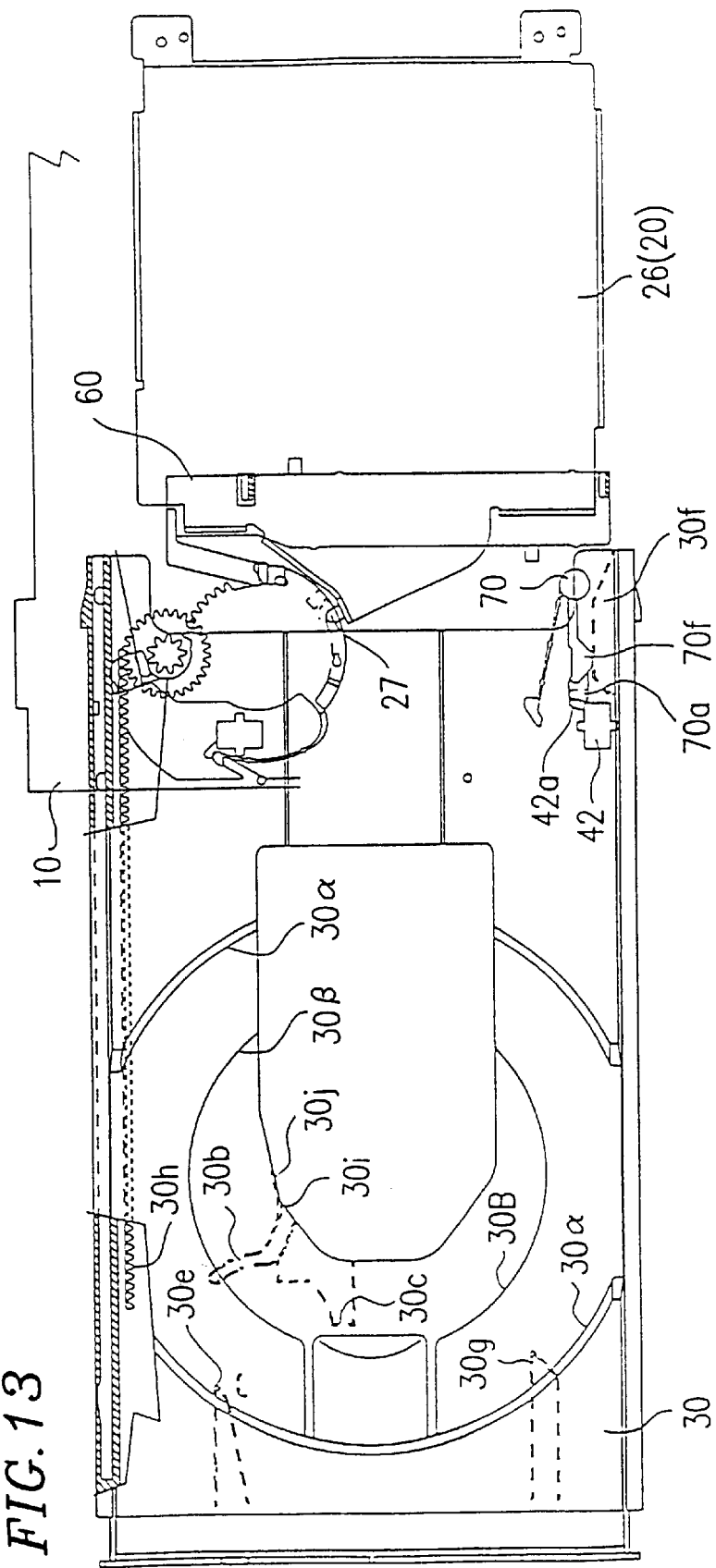
FIG. 13 is a plan view showing the disk driving apparatus according to one embodiment of the present invention in a final ejection state of the ejection operation.

FIG. 13 shows a state where the tray 30 is completely ejected to the full ejection position as described above. Specifically, the protrusion 70*f* of the ejection lever 70 is pushed by the ejecting portion 30*f* of the tray 30 so as to rotate the ejection lever 70. As a result, the protrusion 70*a* pushes the lever 42*a* of the detector 42, thereby detecting the full ejection position (a final ejection state) of the tray 30.

During the steps shown in FIGS. 10A through 10C, 11A through 11C, 12, and 13, the second lateral tray regulating wall 30*s* is under the pressure of the lateral surface 10*s*, and the first lateral tray regulating wall 30*q* of the tray 30 is supported by the first and second lateral guiding portions 10*p* and 10*q*. Therefore, the tray 30 is stable against the main body, thereby preventing lateral vibration.

During the steps shown in FIGS. 11A through 11C, 12, and 13 where the tray 30 is projecting out from the disk driving apparatus, the rotation body 50 is separated from both the gear 48 and the tray 30. Therefore, even when the tray 30 is forcibly halted by an operator or other factors while it is projecting out from the disk driving apparatus, or the tray 30 is forcibly pulled out from or pushed into the disk driving apparatus, the rotation body 50 for ascending and descending the head base unit 20 is not affected at all and stays at the predetermined position.

Moreover, even in the cases of, for example, power breakdown, mechanical trouble or assembling the apparatus where the motor 40 of the disk driving apparatus does not operate, the disk inside the disk driving apparatus can manually be taken out. Specifically, the operator manually rotates the operation lever 50*g* exposing at the bottom surface of the main body 10 in the direction indicated by the arrow 50C. As a result, the disk driving apparatus undergoes the steps shown in FIGS. 8A through 8C, 9A through 9B, 10A through 10C and 11A through 11C so that the synchronous protrusion 50*b* will push the tray 30 at the synchronous cam 30*b* in the direction indicated by the arrow 30A. Thus, the operator can hold the front end of the tray 30 and pull out the tray 30, thereby taking out the disk on the tray 30. The operation lever 50*g* of the rotation body 50 has the hook 50*h* which hooks onto the bottom surface of the main body 10, thereby preventing unsteadiness of the rotation body 50 in the upward direction. Accordingly, the head base unit 20 can be accurately ascended and descended.

Once the tray 30 is ejected to the full ejection position as described above, the operator can place a disk on the circle grooves 30α and 30β of the tray 30. The tray 30 is then inserted into the disk driving apparatus by following the above-described steps in a reverse order. Once the tray 30 reaches the deepest closed position in the disk driving apparatus, the rotation body 50 is rotated so that the head base unit 20 is ascended to the upper position, whereby recording/reproduction operation may be performed on the disk.

As shown in FIGS. 8B' and 8C', the pin 27 is supported by a highest portion 50Y of the cam groove 50*a* of the rotation body 50. The bottom surface of the second head base 26 is lifted to a position higher than the positions of the head base supporting faces 60*a* and 60*b*. The head base supporting body 60 moves in the direction indicated by the arrow 60A so as to slip under the second head base 26.

Even in the case where the second head base 26 is lifted to a position equal to or lower than the positions of the head base supporting faces 60*a* and 60*b* due to fitting unsteadiness of the rotation body 50, guiding chamfers 60*i* and 60*j* (provided for the respective head base supporting faces 60*a* and 60*b*) will be guided by guiding chamfers 26*i* and 26*j* (provided for the second head base 26). Consequently, the head base supporting body 60 slips under the second head base 26.

According to the present invention, the gears of the tray driving system are disconnected from the rotation body while the tray is projecting out from the disk driving apparatus. Therefore, even when the tray is forcibly halted by an operator or other factors while it is moving outwardly from the disk driving apparatus, or the tray is forcibly pulled out from or pushed into the disk driving apparatus, the rotation body for ascending and descending the head base unit is not affected at all and stays at the predetermined position.

Furthermore, since the rotation protrusion pushes the tray protrusion substantially in the same direction as the direction of ejection of the tray, the size of the disk driving apparatus can be minimized. Moreover, even when the number of the teeth of the tray gear greatly differ from that of the teeth of the rotation body gear due to limitation of gear ratio, the teeth of the tray rack and the teeth of the tray gear can be repeatedly engaged correctly simply by selecting an integer n for the gear ratio.

By providing the head base supporting body which is intermittently engaged to be driven by the rotation body, the head base unit can be supported by two supporting faces, thereby increasing the area for supporting the head base unit. Accordingly, damage caused by abnormal impact on the disk driving apparatus (e.g., dropping on the floor) can be greatly minimized.

Furthermore, according to the present invention, pressure is provided on the sides of the tray immediately before the tray rack engages with the tray gear. Accordingly, lateral vibration of the tray during the ejection of the tray can be decreased. As a result, the end tooth of the tray rack can be engaged with the correct tooth of the tray gear, thereby realizing stable traveling of the tray.

Thus, according to the present invention, while the tray is projecting out from the disk driving apparatus, the gears of the tray driving system are separated from the rotation body. Therefore, even when the tray is forcibly halted by an operator or other factors while it is moving outwardly from the disk driving apparatus, or the tray is forcibly pulled out from or pushed into the disk driving apparatus, the rotation body for moving the head base unit to first and second positions is not affected at all and stays at the predetermined position.

Furthermore, the rotation protrusion pushes the tray protrusion substantially in the same direction as the direction of ejection of the tray. Therefore, even when the number of the teeth of the tray gear greatly differ from that of the teeth of the rotation body gear due to limitation of gear ratio, the teeth of the tray rack and the teeth of the tray gear can be re-engaged correctly simply by selecting an integer n for the gear ratio.

Moreover, according to the present invention, the head base supporting body which is intermittently engaged to be driven by the rotation body is provided. The head base unit can be supported by two supporting faces. Accordingly, damage caused by impact on the disk driving apparatus (e.g., dropping on the floor) can be greatly minimized.

According to the present invention, pressure is provided on the sides of the tray immediately before the tray rack engages with the tray gear. Accordingly, lateral vibration of the tray during the ejection of the tray can be decreased. As a result, the end tooth of the tray rack can be engaged with the correct tooth of the tray gear, thereby realizing stable traveling of the tray.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk driving apparatus, comprising:

a head base unit which supports a head for recording data into and reproducing data from a storage medium, the head base unit being able to travel between an operative position where the head is close to the storage medium for recording data thereto and reproducing data therefrom, and a non-operative position where the head is apart from the storage medium;

a tray provided with a tray rack extending in a sliding direction of the tray, the tray being slidable between a fully retracted position at which the head performs recording and reproduction on the storage medium and a fully extended position at which an operator can place the storage medium;

a driving power source;

a tray gear for driving the tray rack, which is driven by the driving power source;

a rotation body gear which is driven by the driving power source, and is mounted to rotate about a fixed axis;

a partial gear which engages the rotation body gear for driving the head base unit from the rotation body gear, the partial gear being rotatable from a first position at which it does not engage the rotation body gear, to a second position at which it does engage the rotation body gear;

a rotation body driven by the rotation of the partial gear, to reciprocally rotate so that the head base unit travels between the operative position and the non-operative position;

a rotation body lock portion provided on the rotation body, which locks the rotation movement of the rotation body and the partial gear at the first position, for maintaining the head base unit at the non-operative position; and an unlock portion provided on the tray, which acts on the rotation body lock portion so as to allow rotation of the rotation body and the partial gear out of the first position, wherein the partial gear is separated from the rotation body gear and the tray gear, so as to separate the rotation body from the tray when the tray rack is in a position other than the fully retracted position.

2. A disk driving apparatus according to claim 1, wherein:

the rotation body lock portion includes an elastic portion integrally provided for the rotation body and a lock detent provided on a tip of the elastic portion, which is detachable from a hook provided for a main body; and the unlock portion releases the engagement between the lock detent and the hook by pushing the lock detent while the tray is inserted into the disk driving apparatus.

3. A disk driving apparatus according to claim 1, wherein the unlock portion rotates the rotation body at the engagement between the tray and the rotation body in a direction where the lock detent departs from the hook, immediately before the locking of the lock detent during the ejection of the tray or immediately before the unlocking of the lock detent during the insertion of the tray.

4. A disk driving apparatus according to claim 1, wherein the tray gear which is driven by the driving power source, for engaging the tray gear to move the tray, rotates about a fixed axis of rotation and rotates concurrently with the driving power source, the tray rack has a length such that the tray rack only partially engages the tray gear depending on the position of the tray, the tray rack engaging and being driven by the tray gear when the tray is at the fully extended position or between the fully extended and fully retracted positions, and the tray rack moving out of engagement with the tray gear as the tray reaches the fully retracted position, and the rotation body comprises a protrusion which is operative, when the rotation body moves the head base unit to the non-operative position, to push the tray from the fully retracted position such that the tray rack re-engages the tray gear, to drive the tray to the fully extended position.

5. A disk driving apparatus according to claim 4, wherein a ratio of the number of teeth of the tray gear and the number of teeth of the rotation body gear is an integer.

6. A disk driving apparatus, comprising:

a head base unit which supports a head for recording data into and reproducing data from a storage medium, the head base unit being able to travel between a first position where the head is close to the storage medium for recording data thereto and reproducing data therefrom and a second position where the head is apart from the storage medium;

a tray provided with a tray rack extending in a sliding direction of the tray, the tray being slidable between a third position at which the head performs recording and reproduction on the storage medium and a fourth position at which an operator can place the storage medium;

a rotation body which makes the head base unit travel between the first position and the second position;

a rotation plane provided integrally with the rotation body on a plane that intersects with a rotation shaft of the rotation body at a right angle;

a rotation concave portion provided for part of the rotation plane;

a lock concave portion provided in a main body;

a head base supporting body which supports the head base unit at the first position;

head base supporting faces provided for parts of the head base supporting body and movable under the head base unit and relative to the head base unit, to thereby support the head base unit at the first position;

a lock convex portion provided for the head base supporting body, which has elasticity and is detachable from the lock concave portion of the main body; and a rotation convex portion integrally provided with the lock convex portion, which is detachable from the rotation concave portion of the rotation body, wherein:

the head base supporting body is resting out of engagement with the head base unit while the rotation body is rotated so as to make the head base unit travel from the first position to the second position since the rotation convex portion is pushed by the rotation plane and the lock convex portion is engaged with the lock concave portion; and when the head base unit completes traveling, the rotation concave portion engages with the rotation convex portion and the head base supporting body travels together with the rotation body so that the head base supporting faces slip under the head base unit to engage the head base unit, thereby supporting the head base unit.

7. A disk driving apparatus according to claim 6, wherein:

the head base supporting faces start to slip under the head base unit while the head base unit is lifted higher than the first position by the rotation body; and the head base unit and the rotation body are structured such that after the head base unit is moved by the rotation body and placed on the head base supporting faces, the engagement between the head base unit and the rotation body is released.

8. A disk driving apparatus according to claim 6, wherein:

the tray engages with the rotation body at the second position;

after making the head base unit travel from the first position to the second position, the rotation body is able to eject the tray for a predetermined distance via the engagement section between the rotation body and the tray;

the rotation body is provided with an operation lever which is exposed so as to allow operation thereof from outside the main body; and the operation lever is engaged with a portion of the main body and has a shape such that force on the main body, which is received from the rotation convex portion caused by elasticity of the head base supporting body, is controlled.

9. A disk driving apparatus according to claim 6, wherein each of portions of the head base supporting faces where they first slip under the head base unit is provided with a guiding shape.

10. A disk driving apparatus according to claim 6, wherein each of portions of the head base unit where the head base supporting faces first slip is provided with a guiding shape.

11. A disk driving apparatus, comprising:

a head base unit which supports a head for recording data into and reproducing data from a storage medium, the head base unit being able to travel between a first position where the head is close to the storage medium for recording data thereto and reproducing data therefrom and a second position where the head is apart from the storage medium;

a tray provided with a tray rack extending in a predetermined direction, the tray being slidable along the tray rack between a third position at which the head performs recording and reproduction on the storage medium and a fourth position at which an operator can place the storage medium;

a first lateral tray regulating wall provided for the tray in a parallel direction with respect to the sliding direction;

a second lateral tray regulating wall provided in a parallel direction with respect to the sliding direction so as to oppose to the first lateral tray regulating wall;

a concave shaped tapered regulation releasing portion provided for the second lateral tray regulating wall;

a first lateral guiding portion and a second lateral guiding portion provided next to each other in a direction of sliding of the tray, both of the first lateral guiding portion and the second lateral guiding portion making contact with the first lateral tray regulating wall;

lateral protrusions which, between the first lateral guiding portion and the second lateral guiding portion, press the first lateral tray regulating wall and the second lateral tray regulating wall against the first lateral guiding portion and the second lateral guiding portion;

a driving power source;

a tray gear driven by the driving power source;

a rotation body gear driven by the driving power source;

a partial gear partially engaged with the rotation body gear at a predetermined angle; and a rotation body which reciprocally rotates, in accordance with the rotation of the partial gear so as to make the head base unit travel between the first position and the second position, wherein:

when the tray is present at the third position, the position of the tapered regulation releasing portion matches with the position of the lateral protrusion so that the pressure of the lateral protrusion on the second lateral tray regulating wall is released; and in the ejection step where the rotation body which is rotationally driven by the rotation body gear, makes the tray conveyed forward at the engagement between rotation body and the tray so that the tray rack is engaged with the tray gear, the position of the tapered regulation releasing portion is shifted from the position of the lateral protrusion, immediately before the tray rack is engaged with the tray gear, whereby the lateral protrusion presses the second lateral tray regulating wall.

12. A disk driving apparatus according to claim 11, wherein a ratio of the number of teeth of the tray gear and the number of teeth of the rotation body gear is an integer.

* * * * *

UNITED STATES PATENT AND TRADEMARK OFFICE
CERTIFICATE OF CORRECTION

PATENT NO. : 6,345,027 B1
DATED : February 5, 2002
INVENTOR(S) : Saji et al.

It is certified that error appears in the above-identified patent and that said Letters Patent is hereby corrected as shown below:

<u>Title page,</u>
Item [56], References Cited, U.S. PATENT DOCUMENTS, insert the following references:

```
-- 5,768,238   06/1998   Tanka
   5,691,969   11/1997   Fujisawa
   5,204,850   04/1993   Obata
   5,123,005   06/1992   Kurosu --
```

Signed and Sealed this

Twenty-sixth Day of November, 2002

Attest:

Attesting Officer

JAMES E. ROGAN
*Director of the United States Patent and Trademark Office*